Jan. 13, 1931. W. P. KELLETT 1,788,631
MEANS FOR SECURING FREIGHT CONTAINERS
Filed Sept. 14, 1929 2 Sheets-Sheet 1
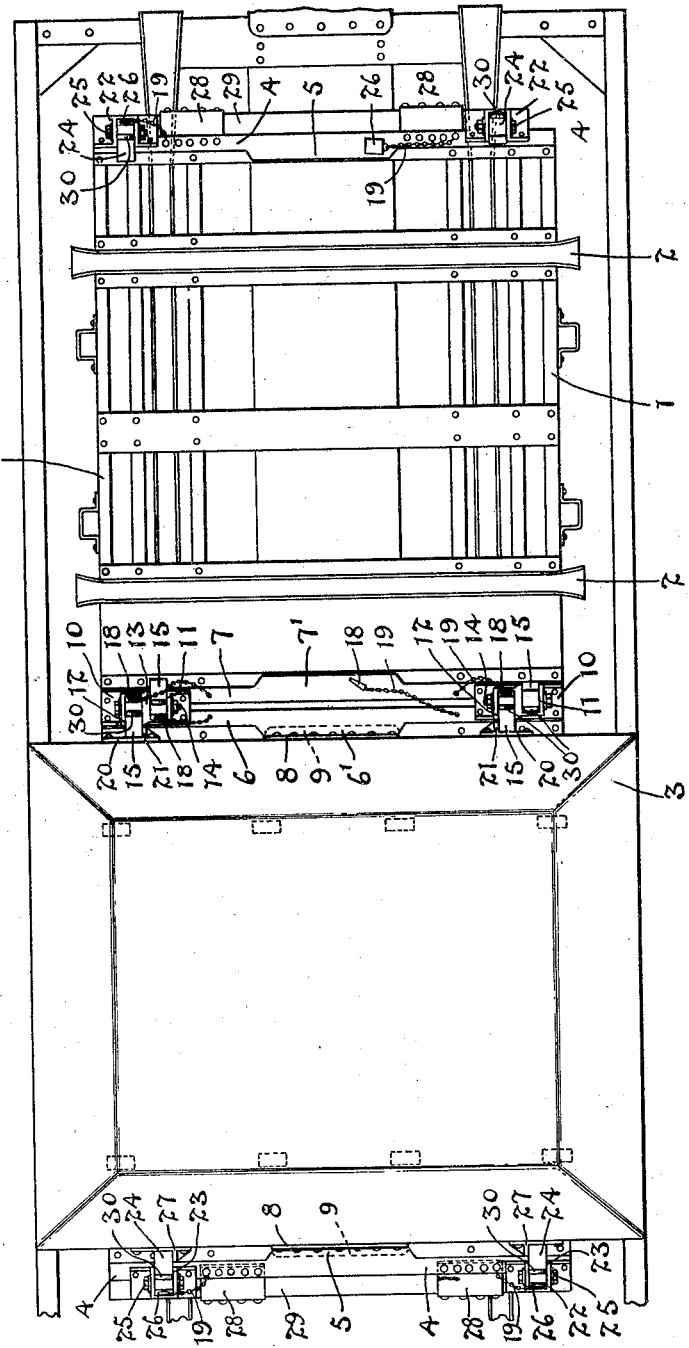
Inventor.
William Platts Kellett.

Jan. 13, 1931.  W. P. KELLETT  1,788,631
MEANS FOR SECURING FREIGHT CONTAINERS
Filed Sept. 14, 1929  2 Sheets-Sheet 2
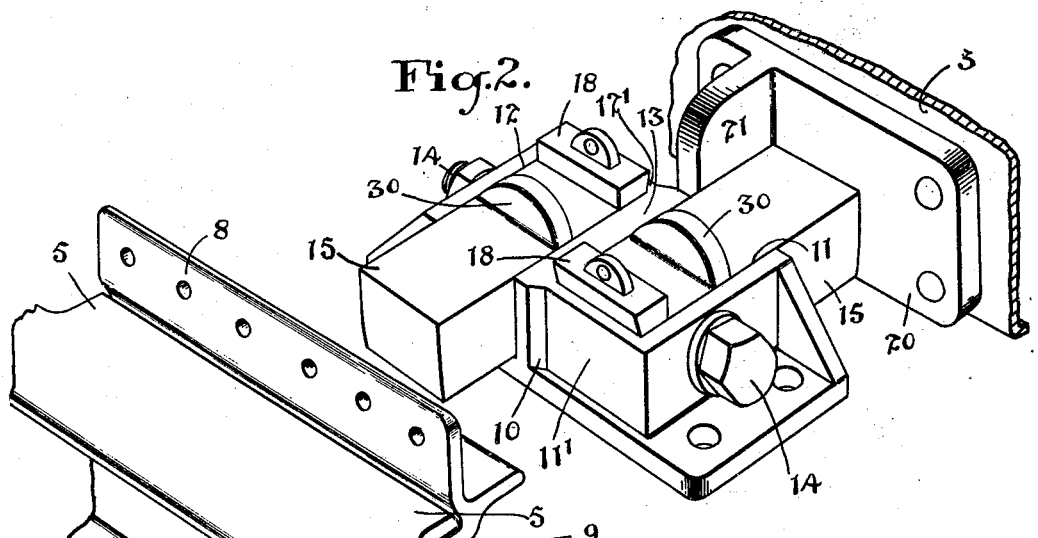
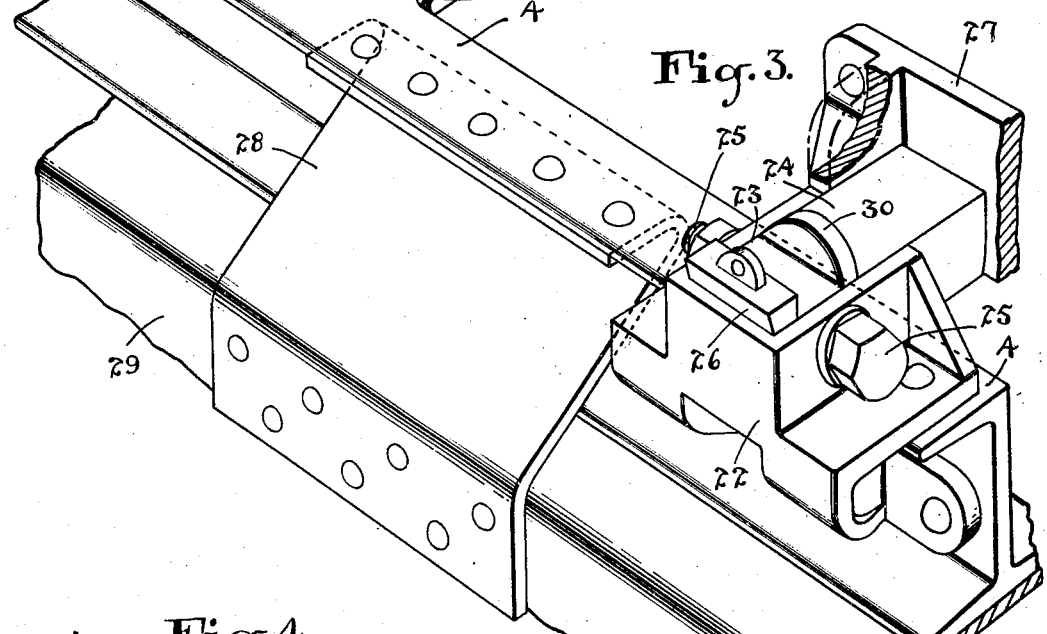
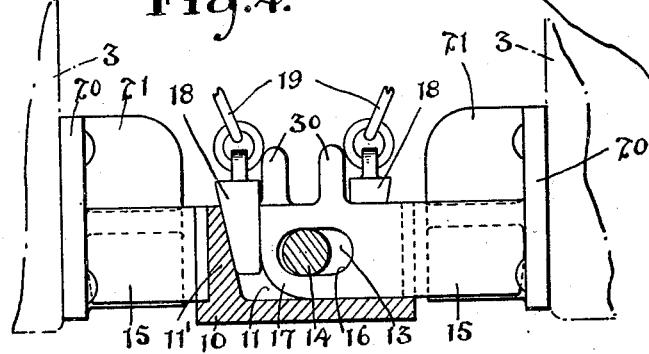
Inventor.
William Platts Kellett.

Patented Jan. 13, 1931

1,788,631

UNITED STATES PATENT OFFICE

WILLIAM PLATTS KELLETT, OF NEW YORK, N. Y.

MEANS FOR SECURING FREIGHT CONTAINERS

Application filed September 14, 1929. Serial No. 392,552.

The principal objects of this invention are to provide means for effectively securing individual freight containers upon dolly trucks mounted on freight cars equipped for the side unloading of the containers from the cars, so that the containers will be effectively secured from displacement while the car is in transit.

The principal features of the invention consist in the novel construction and arrangement of locks for holding the container from lateral displacement on the car, which enable the ready placing of the container and removal thereof from the dolly truck but which bind the container rigidly in position, and further in providing means for holding the container down to the truck to prevent it from swaying or rocking when the car is in transit.

In the accompanying drawings, Figure 1 is a plan view of a dolly truck showing one container arranged thereon.

Figure 2 is an enlarged perspective view of one of the centre container locks and the engaging keeper on the container.

Figure 3 is an enlarged perspective view of one of the container locks arranged at the end of the dolly truck.

Figure 4 is an enlarged elevation and part vertical section of one of the centre locks.

It has been proposed, as shown in my previous Patents No. 1,693,607 of December 4, 1928, and No. 1,675,562 of July 3, 1928, to provide freight transporting equipment with a dolly truck for supporting individual freight containers for side unloading upon a railway car and the present invention is directed to improvements in the equipment of these dolly trucks and the containers.

Upon reference to the drawings, it will be seen that the frame 1 of the dolly truck has mounted transversely thereof two pairs of channel-shaped tracks 2 which are adapted to receive the wheels or roller supports of the containers 3.

Arranged at either end of the truck and extending transversely thereof are lock beams 4 which are preferably of the I-beam type and the top flange thereof is cut away on the inner side at both ends, leaving an inwardly extending lip 5 which is approximately about one-third of the length of the beam.

A pair of similar beams 6 and 7 are arranged centrally of the frame 1 and each is provided with the flange lip 6' and 7' respectively.

Each container 3 has secured to its bottom side edge an angle bracket 8, preferably in the form of a steel casting which is securely riveted to the side and bottom wall of the container and these brackets each have an outwardly projecting horizontal flange 9 which is adapted to slide under the lips 5, 6' and 7' of the beams 4, 6 and 7.

The flanges 9 and locking beam lips engage in close fitting contact to hold the container from tipping sideways from the effect of longitudinal shocks occurring in the body of the car on which the dolly truck is mounted.

The containers are each provided with four pairs of wheels engaging the tracks 2 and as the flanges 9 and the engaging lips of the locking beams are shorter than the distance between the pairs of container wheels, the container can be rolled to clear the locking flanges while retaining its longitudinal balance and when thus cleared it can be lifted from the car by a crane if desired. The flange arrangement also allows considerable latitude of movement in rolling containers on or off the cars.

Rigidly mounted at each end of the central pair of beams 6 and 7 is a casting 10 which is formed with a pair of rectangular-shaped recesses 11 and 12 in the top thereof. The recesses 11 and 12 are separated by a central web 13 and the recess 11 has an open side at one side of the casting and the recess 12 has an open side at the opposite side of the casting.

A pin 14 extends horizontally through the end walls and central web of the casting and forms a hinge and retaining pin for the flapper blocks 15. These blocks fit snugly into the recesses 11 and 12 and project from the open side of said recesses at opposite sides of the casting.

Each block is provided with an elliptical shaped transverse hole 16 through which the pin 14 extends and the bottom inner corners 17 of the blocks are rounded to permit their swinging upwardly on the pin.

The end walls 11' and 12' of each of the recesses 11 and 12 are preferably tapered upwardly toward the top and wedge blocks 18 secured by chains 19 to the beams 6 and 7 are adapted to be inserted between the tapered end walls of the casting and the ends of the flapper blocks to hold the said blocks in adjusted positions.

Keeper blocks 20 are rigidly secured to the side walls of the container 3 and are formed with right angularly projecting flanges 21 which are arranged to engage the inward side faces of the flapper blocks to hold the containers rigidly in position from lateral movement on the dolly truck.

Attached to the end beams 4 are castings 22, each provided with a rectangular recess 23 in the top and open at the inner side.

A single flapper block 24 of similar construction to the blocks 15 is arranged in each of these recesses and secured therein by a horizontal pin 25 and wedge blocks 26 similar to the wedge blocks 18 are arranged for securing the flapper blocks 24 in place.

Keeper blocks 27 similar to the keeper blocks 20 are provided on the container.

The keeper blocks are so arranged that they will match with the flapper blocks on either the end or centre block beams whichever way the container may be placed in position.

The central block members are supported upon the pair of beams 6 and 7 and in order to provide ample support for the end beams 4 I provide the angle plate brackets 28 which are secured under the outer flange of the beam and to the sill 29 of the dolly truck.

In the use of this equipment, when it is desired to place a container upon a car equipped with a dolly truck, the wedge blocks are removed from engagement with the flapper blocks on both sides of the car the container is to be entered and the flapper blocks are turned upwardly, the ones at the other side of the car being left down.

The container is then rolled on to the track-ways 2 so that the lip flanges 5, 6' and 7' engage the flanges 9 of the angle brackets on the container and when the keeper blocks at the far side of the container engage the flapper blocks the container is brought to rest.

The flapper blocks on the loading side are then thrown down and the wedge blocks are then inserted and driven home to force the ends of the flapper blocks snugly up against the keepers back of their retaining flanges. The flapper blocks on both sides of the car are preferably thus adjusted so as to provide an additional guard against any movement of the container longitudinally of the car in the event of the locking flanges 9 having any loose play in their contact with the retaining lips of the lock beams.

The retaining lips of the lock beams hold the containers firmly down upon the deck of the dolly truck and the flapper blocks lock the containers securely from side movement as well as from further end movement.

The construction of locking members herein described is extremely simple but it is very effective in use and is strong and rugged and will withstand the terrific shocks imparted thereto in railway traffic.

When a container is to be removed from a dolly truck it is merely necessary to remove the wedge blocks on the side from which the container is to be removed, then turn the flapper blocks upwardly and the container is then free.

The flapper blocks are here shown with lugs 30 projecting upwardly from the top sides. These lugs are preferably provided to prevent the flapper blocks from being left in an unlocked position and the flapper blocks are of such length that they will engage the keepers on the container whether the wedges are inserted behind them or not. This provides against carelessness on the part of those loading the containers on to the cars, permitting a container to be left unlocked.

What I claim as my invention is:

1. In means for locking freight containers, the combination with a truck on which the container is mounted, of locking members pivotally mounted on the truck, keepers mounted on the container adapted to engage said locking members to hold the container from endwise movement, and interlocking means secured on the container and on the truck adapted to hold the container from longitudinal movement on the truck or from tipping.

2. In means for securing freight containers, the combination with the truck on which the container is mounted, of flange members extending longitudinally of the containers and arranged on the sides thereof at the bottom intermediate of the length thereof, laterally flanged bars rigidly mounted on and extending transversely of the truck, said bars having sections of their flanges removed leaving an intermediate intact portion adapted to overlap the flanged members on the container when the container is in position on the truck and to disengage from the flange member of the container when the container is part way withdrawn from the truck, and means rigidly mounted on the truck for locking the containers from movement transversely of the truck.

3. Means for securing freight containers on trucks, comprising in combination, flange members arranged longitudinally of the containers, parallelly arranged flange members rigidly secured to the truck adapted to engage the flange members of the container in locking contact, keeper members projecting from the side walls of the containers, blocks rigidly mounted on the truck having open recesses in the top thereof, and flapper blocks pivotally mounted in said recesses adapted to engage said keepers to hold the container from transverse movement on the truck.

4. Means for securing freight containers on trucks, comprising in combination, flange members arranged longitudinally of the containers, parallelly arranged flange members rigidly secured to the truck adapted to engage the flange members of the container in locking contact, keeper members projecting from the side walls of the containers, blocks rigidly mounted on the truck having open recesses in the top thereof, flapper blocks pivotally mounted within the recesses in the aforesaid blocks, and capable of longitudinal movement from the recesses for engaging the containers, and wedge means for insertion into the recesses back of the flapper blocks to hold them in engagement with the containers.

5. Means for securing freight containers on trucks, comprising castings rigidly secured to the truck having open rectangular recesses in the top open at one side, a pin extending through the walls of said recesses, a flapper block loosely arranged in each recess and having an elongated opening through which said pin extends, a wedge member adapted to be inserted between the back wall of the recess and said flapper block, and a keeper rigidly secured to the container having a flange projection to engage the projecting end of the flapper block.

6. In means for securing freight containers to trucks, the combination with the truck having transverse trackways thereon, parallelly arranged beams extending transversely of the truck having centrally arranged lip projections, bracket members rigidly secured to the container having flange projections adapted to engage said lip projections, blocks mounted on said beams at the ends having rectangular recesses in the top side, said recesses having an open side opening toward the container, pins extending transversely of the recesses, flapper blocks pivotally and slidably mounted on said pins within said recesses, wedge blocks adapted to be inserted between the closed end of the recesses and the flapper blocks, and flanged keepers mounted on the containers adapted to be engaged by said flapper blocks.

WILLIAM PLATTS KELLETT.